United States Patent Office 3,540,906
Patented Nov. 17, 1970

3,540,906
AIR-BLOWN HOMOGENEOUS ASPHALT COMPOSITION CONTAINING HYDROXY-TERMINATED POLYDIENE OIL OF HIGH VISCOSITY TO PENETRATION RATIO
Eugene M. Fauber, Hammond, Ind., assignor to Sinclair Research, Inc., New York, N.Y., a corporation of Delaware
No Drawing. Filed Apr. 6, 1967, Ser. No. 628,828
Int. Cl. C08h 13/00, 17/22; C08j 1/46
U.S. Cl. 106—278                              4 Claims

ABSTRACT OF THE DISCLOSURE

A composition having improved homogeneity and viscosity to penetration ratio is produced by air blowing an asphalt containing a minor amount of hydroxyl-terminated polyidene oil. The composition is especially suitable as a paving asphalt. It is preferred that the hydroxyl groups on the polyidene be allylic.

This invention relates to a process for preparing an asphalt composition having improved properties for use either alone or as a blend with other asphalts as a paving composition.

It is considered particularly desirable that asphalts to be used for paving purposes possess a relatively high viscosity to penetration ratio. The value of the ratio is determined by measuring the viscosity at 275° F. and the needle penetration at 77° F.

In order to obtain the desired high viscosity to penetration ratio, it is well known that asphalts may be air blown. Unfortunately, conventional air blowing while increasing the viscosity and decreasing the needle penetration of the asphalt also has been found to cause the asphalt to become non-homogeneous before sufficient hardening takes place. This non-homogeneity in turn effects the performance of the asphalt as a paving material to the extent that some states now specify that paving asphalts be homogeneous.

It has been found by the present invention that by adding a small amount, e.g. from about 0.1 to 2 weight percent, of a hydroxyl-terminated polyidene oil to a major amount of asphalt and then air blowing, a product is obtained which possesses a superior viscosity to penetration ratio and which is homogeneous.

The preferred polyidene polymer of the present invention is a hydroxyl-containing polymer oil generally having on the average at least about 1.8 predominantly primary, terminal, i.e., attached to a terminal carbon atom, hydroxyl groups per polymer molecule. Most advantageously, the polymer has greater than two average allylic, terminal hydroxyl groups, e.g., at least 2.1 to, say 2.6, or even 3 or more. Also, two terminal hydroxyls are generally separated by a long carbon-carbon chain. Determined as milliequivalents of potassium hydroxide equivalent to the hydroxyl content of one gram of polymer, the polymers will often have a hydroxyl value of about 0.5 to 1.5, preferably 0.7 to 1.0. The hydroxyl-containing diene polymers used in the present invention may have number average molecular weights in the range of about 200 to 25,000 (Staudinger) and viscosities at 30° C. of about 5 to 20,000 poises.

The diene polymers which are used in this invention have primary hydroxyl groups which are allylic in configuration. The preferred diene partial polymer also has the majority of its unsaturation in the main hydrocarbon chain, providing polymers of improved elasticity characteristics.

The dienes which are employed to make the diene polymers are unsubstituted, 2-substituted or 2,3-disubstituted 1,3-dienes of up to about 12 carbon atoms. The diene preferably has up to 6 carbon atoms and the substituents in the 2- and/or 3-position may be hydrogen, alkyl, generally lower alkyl, e.g. of 1–4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, etc.

The hydroxyl-terminated diene homopolymer and copolymer products used in accordance with the present invention preferably have a hydroxyl-functionality greater than two, e.g., in the range of 2.1 to 2.6, although the functionality may exceed the range cited, e.g., it may range up to three or more. Those polymers of greatest utility have been found to have primary hydroxyl groups in terminal allylic positions on the main, generally longest, hydrocarbon chain of the molecule. By "allylic" configuration is meant the alpha-allylic grouping of allylic alcohol, that is, the hydroxyls of the intermediate polymer or the hydroxyl residues of the finished elastomer are attached to a carbon adjacent to a double-bond carbon.

Olefinically unsaturated monomers may be incorporated into the diene used in this invention. Usable monomers include alpha-mono-olefinic materials of about 2 or 3 to 10 or 12 carbon atoms such as styrene, vinyl toluene, methyl methacrylate, methylacrylate, acrylic esters, vinyl chloride, vinylidene chloride, etc. The choice and amount of mono-olefinic monomer employed will often be determined on the basis of properties desired in the final elastomer resin. Generally the amount of mono-olefinic monomer in the polymer will be about 0–75% by weight of the total addition polymer, preferably about 1 to 40%, or even about 10–40%.

Four hydroxyl-terminated polybutadiene polymers are described as being exemplary of those which may be used in the present invention. Polybutadiene 45 is a polybutadiene homopolymer having a viscosity of 50 poises at 30° C., a hydroxyl content of 0.95 meq./gm., a hydroxyl number (mg. KOH/gm.) of 53, and an average molecular weight of 2200–2500 about 2.1–2.2 terminal, allylic, hydroxyl groups which are predominantly primary, and an iodine number of 398. The polymer can be prepared by polymerizing 100 parts of butadiene in the presence of 70 parts of isopropanol and 10 parts of hydrogen peroxide in an aluminum clad autoclave at 118° C. for 2 hours. Polybutadiene 15 is a homopolymer having a viscosity at 30° C. of 200 poises, a hydroxyl content of 0.80 meq./gm., a hydroxyl number of 45 mg. KOH/gm., an average molecular weight of 3000–3500, about 2.6 terminal allylic hydroxyl groups which are predominantly primary and an iodine number of 395. This polymer can be made by polymerizing 100 parts of butadiene in the presence of 35 parts of isopropanol and 6 parts of hydrogen peroxide for 2½ hours at 130° C. Styrene copolymer 15 has a molecular weight of about 2200–2500, a viscosity at 30° C. of 250 poises, a hydroxyl content (meq./gm.) of 0.95, a hydroxyl number of 53 mg. KOH/gm. about 2.5 terminal, allylic, hydroxyl groups which are predominantly primary; and an iodine number of 335. The copolymer is made by polymerizing 75 parts butadiene and 25 parts styrene in the presence of 70 parts isopropanol and 10 parts of 50% hydrogen peroxide for 2½ hours at 120° C. Acrylonitrile copolymer 15 has a viscosity of 550 poises at 30° C., a hydroxyl content of 0.80 meq./gm., and hydroxyl number of 45 mg. KOH/gm., an average molecular weight of 2500–3000, about 2.5 terminal, allylic hydroxyl groups, which are predominantly primary, and an iodine number of 345. This polymer can be made by copolymerizing acrylonitrile with butadiene in isopropanol solvent and in the presence of hydrogen peroxide using the following ratio of reactants: 85 parts butadiene, 15 parts acrylonitrile, 70 parts isopropanol, 10% hydrogen peroxide. The reactants are heated in an autoclave at 118° C. for 1½ hours and stripped.

The asphalt employed in this invention is of penetration grade and is advantageously obtained by the vacuum reduction of crude universal oil and has a penetration at 77° F. of, for instance, about 50 to 400 (ASTM D5-65). The vacuum reduction of the oil serves to drive off the more volatile components leaving a dark asphaltic material. Continued vacuum reduction will result in an increasingly viscous asphalt as the more volatiles are removed.

Following addition of the polydiene to the asphalt, the mixture is air blown, e.g., at a temperature of about 450–550° F. and approximately at 1 atm. pressure for ½–5 hours in order to produce a decrease of at least about 20% in penetration value. The presence of the polybutadiene in the asphalt produces, on air blowing, an increased rate of oxidation and results in a quite hard composition possessing a penetration of about 25–125, possessing a higher viscosity to penetration ratio and greater homogeneity than the same asphalt without the addition of polybutadiene polymer but air blown to the same hardness.

Reference is now made to the example found in Table I as being indicative of the superior results obtained by the process of this invention. A vacuum-reduced, Mid-Continent asphalt both by itself and containing one percent of the 45 polybutadiene homopolymer was air blown at 500° F. and 3.3 cubic feet of air/hour/pound of charge. Homogeneity is measured by the Oliensis Spot Test (AASHO designation T102), a negative Oliensis Spot being indicative of homogeneous asphalt. As may be seen, addition of the polybutadiene oil initially produced a slight increase in both penetration and viscosity which may be attributed to dilution. However, air blowing of the samples to the same penetration (hardness) produced a market increase in viscosity of the polybutadiene treated specimen over the untreated sample. It will also be observed that air-blowing of the asphalt alone resulted in a non-homogeneous product as indicated by the positive Oliensis Spot Test.

TABLE I

|  | Vacuum reduced mid-continent asphalt | |
| --- | --- | --- |
|  | Alone | With 1% polybutadiene oil added |
| Tests on charges: | | |
| Penetration at 77° F. | 198 | 210 |
| Oliensis spot | Negative | Negative |
| Softening point (R&B), ° F. | 108 | 103 |
| Furol viscosity at 275° F. sec | 94 | 101 |
| Tests on products: | | |
| Penetration at 77° F. | 34 | 34 |
| Oliensis spot | Positive | Negative |
| Softening point (R&B), ° F. | 147 | 160 |
| Furol viscosity at 275° F. sec | 597 | 900 |
| Time of air blowing, hours | 3.0 | 2.7 |

It has also been found that paving asphalt prepared by the instant process may be employed as a blending component along with untreated asphalt to produce a homogeneous material having a superior viscosity to penetration ratio. Table II compares two asphalt compositions, one (A) consisting of the vacuum reduced Mid-Continent asphalt employed initially in Table I along with the air blown, Mid-Continent asphalt polybutadiene oil mixture also shown in Table I. The other asphalt composition (B) consists solely of Mid-Continent asphalt, further vacuum reduced to the same penertration as (A). It may readily be observed that (A), containing the air-blown polybutadiene oil-containing asphalt has a markedly greater viscosity and consequently viscosity to penetration ratio.

TABLE II

| Wt. percent composition | A | B |
| --- | --- | --- |
| Mid-continent asphalt of Example I | 26 |  |
| Air blown mid-continent asphalt+1% poly B-D of Example I | 74 |  |
| Mid-continent asphalt of Example I, vacuum reduced further |  | 100 |
| Total | 100 | 100 |
| Tests: | | |
| Penetration at 77° F. | 56 | 56 |
| Oliensis spot | Negative | Negative |
| Furol viscosity at 275° F., sec | 475 | 210 |

It is claimed:

1. A homogeneous, air-blown asphalt composition of high viscosity to penetration ratio having a penetration at 77° F. of about 25 to 125 obtained by air-blowing an asphalt mixture at a temperature of about 450 to 550° F. and producing a decrease of at least about 20% in the penetration value, said asphalt mixture consisting essentially of penetration grade asphalt having a penetration at 77° F. of about 50 to 400 and a minor amount of hydroxyl-terminated polydiene oil sufficient to give the air-blown asphalt mixture a negative Oliensis Spot Test, said hydroxyl-terminated polydiene oil being an addition polymer of a 1,3-diene of up to about 12 carbon atoms and 0–75% by weight of an alpha-mono-olefinic monomer of about 2 to 12 carbon atoms having primary hydroxyl groups in terminal, allylic positions, a viscosity at 30° C. of about 5–20,000 poises and a number average molecular weight of about 200–25,000.

2. A homogeneous, air-blown asphalt composition of claim 1 wherein the minor amount of hydroxyl-terminated polydiene oil is about 0.1 to 2 weight percent.

3. A homogeneous, air-blown asphalt composition of high viscosity to penetration ratio having a penetration at 77° F. of about 25 to 125 obtained by air-blowing an asphalt mixture at a temperature of about 450 to 550° F. and producing a decrease of at least about 20% in the penetration value, said asphalt mixture consisting essentially of penetration grade asphalt having a penetration at 77° F. of about 50 to 400 and a minor amount of hydroxyl-terminated polydiene oil sufficient to give the air-blown asphalt mixture a negative Oliensis Spot Test, said hydroxyl-terminated polydiene oil being an addition polymer of 1,3-butadiene and having a hydroxyl-functionality of 2.1 to 2.6 predominantly as primary hydroxyl groups in terminal, allylic positions, a viscosity at 30° C. of about 5–20,000 poises and a number average molecular weight of about 200–25,000.

4. A homogeneous, air-blown asphalt composition of claim 3 wherein the minor amount of hydroxyl-terminated polydiene oil is about 0.1 to 2 weight percent.

References Cited

UNITED STATES PATENTS

| 2,705,703 | 4/1955 | Mckay et al. | 106—285 XR |
| 2,906,687 | 9/1959 | Roediger et al. | 208—6 |
| 2,947,697 | 8/1960 | Vierk et al. | 106—278 XR |
| 3,048,562 | 8/1962 | Cull et al. | 106—285 XR |
| 3,265,765 | 8/1966 | Holden et al. | 260—28.5 XR |
| 3,275,586 | 9/1966 | Wurstner et al. | 106—274 XR |

JULIUS FROME, Primary Examiner

J. B. EVANS, Assistant Examiner

U.S. Cl. X.R.

208—23, 44; 260—28.5